(12) United States Patent
Gorowski

(10) Patent No.: US 7,182,685 B2
(45) Date of Patent: Feb. 27, 2007

(54) DOUBLE FUNCTION-HAND OPERATED MEAT TENDERIZER

(76) Inventor: Victor Gorowski, 266 Cherry La., Floral Park, NY (US) 11001

( * ) Notice: Subject to any disclaimer, the term of this patent is extended or adjusted under 35 U.S.C. 154(b) by 0 days.

(21) Appl. No.: 11/167,665

(22) Filed: Jun. 27, 2005

(65) Prior Publication Data

US 2005/0239388 A1    Oct. 27, 2005

Related U.S. Application Data

(60) Provisional application No. 60/584,989, filed on Jul. 2, 2004.

(30) Foreign Application Priority Data

Nov. 15, 2003   (PL) .................................. 363464

(51) Int. Cl.
    *A22C 9/00*  (2006.01)
(52) U.S. Cl. ............................................. 452/141
(58) Field of Classification Search ............ 241/22, 241/26, 27, 83, 84, 94, 95, 201, 262, 263, 241/270, 284, 285.1, 285.2, 286, 168, 169, 241/169.2; D7/669, 682, 372
See application file for complete search history.

(56) References Cited

U.S. PATENT DOCUMENTS

| | | | |
|---|---|---|---|
| 207,107 A | | 8/1878 | Davies |
| 1,047,107 A | | 12/1912 | Walker |
| 3,661,072 A | * | 5/1972 | Allinquant et al. ........... 99/532 |
| 4,199,841 A | * | 4/1980 | Jaccard ....................... 452/146 |
| 4,463,476 A | * | 8/1984 | Jaccard ....................... 452/146 |
| 4,870,717 A | * | 10/1989 | Hirano ....................... 452/147 |
| 6,948,670 B2 | * | 9/2005 | Kujawski et al. ........... 241/169 |

* cited by examiner

*Primary Examiner*—Thomas Price
(74) *Attorney, Agent, or Firm*—The Farrell Law Firm

(57) ABSTRACT

Disclosed is a double function-hand operated meat tenderizer according to the preferred embodiment of the present invention includes a handle being formed of two components, a blade assembly being detachably mounted between the two components of the handle, a plurality of columns where upper ends of the columns are mounted on the handle, and a comb being mounted on lower ends of the columns for being slidably movable toward and away from the handle. The comb has plurality of flow-through slots and protruding teeth extending from a bottom surface of the comb.

10 Claims, 4 Drawing Sheets

A - A'

DOUBLE FUNCTION-HAND OPERATED MEAT TENDERIZER

PRIORITY

This application claims priority to an application entitled "Meat Tenderizing Machine" filed in The Patent Office of the Republic of Poland on Nov. 15, 2003 and assigned Serial No. P363464 and to a United States Provisional Application entitled "Double Function-Hand Operated Meat Tenderizer" filed on Jul. 2, 2004 and assigned U.S. Provisional Application No. 60/584,989, both contents of which are incorporated herein by reference.

BACKGROUND OF THE INVENTION

1. Field of the Invention

The present invention relates to a meat tenderizer, and more particularly relates to a double function-hand operated meat tenderizer.

2. Description of the Related Art

According to generally accepted standards in the quality and tenderization of meats for consumption, the meat is preferably matured for a period of three weeks before it is allowed onto the market to be sold. During the maturation process, the connective tissue and meat react with natural enzymes and bacteria present in the meat, which leads to a partial tenderization of the meat and renders it fit for consumption. In order to shorten the time in which the meat matures, and to increase the tenderness of the meat, various methods are used. In one of these methods for tenderizing the meat, high temperature, light, or both, are applied to the meat which speeds up the reaction of the enzymes and bacteria in the meat.

A chemical-type tenderizing method has also been extensively used for tenderizing the meat. This method involves the addition of chemical substances that affect the connective tissue as well as the reaction of the meat to a chemical composition during treatment. While these processes have been somewhat successful on the market, two of the most important drawbacks in the chemical tenderizing method are high operating costs and loss of taste in the meat.

Another method of tenderizing meats is a mechanical-type tenderizing method, such as pounding or surface treating of the meat using a mallet-like instrument or piercing element blades. More particularly, many hand-operated mechanical meat tenderizers that are intended for home use are disclosed in U.S. Pat. No. 207,107 issued 1878; U.S. Pat. No. 1,047,346 issued 1912; and U.S. Pat. No. 4,199,841 issued 1980. The mechanical-type tenderizing method, that is based on the pounding of the surface of the meat with a tenderizing mallet not only cause loss of natural juices of the meat, but also tend to create sinewy lumps. In the mechanical method using long, thin knife blades, the blades repeatedly thrust in to the meat cutting through the connective tissues, but even after meats were tenderized using these blade tenderizers, the meat would not be tender. Further, the handle and the guiding movable plate of the meat tenderizer using a plurality of blades are easy to slip out of the user's hand or meat during the process of tenderizing the meat which was very dangerous for the user due to the sharp blades. In order to clean or replace the blades, the user needed to disassemble the tenderizer, but in certain cases the cleaning or the replacement of the blades of these tenderizers was quite complicated.

SUMMARY OF THE INVENTION

Accordingly, an improved meat tenderizer for flattening and piercing meat simultaneously while preventing the tenderizer from slipping out of the user's hand or meat during the process of tenderizing meats is required. Thus, several aspects must be considered when the meat tenderizer is designed.

Accordingly, the present invention has been made to solve at least the above-mentioned problems occurring in the prior art.

It is therefore an object of the present invention to provide a double function and hand operated meat tenderizer that may be used by restaurants, but is also suitable for household use with maximum convenience.

It is another object of the present invention to provide a double function meat tenderizer which tenderizer the meat based on making thin cuts in the meat, using a specially constructed array of closely spaced blades that slice through the tendons and connective tissue in the meat but not braking them, thus tenderizing the meat.

It is a further object of the present invention to provide a double function meat tenderizer which tenderizes and pierces the meat simultaneously while preventing the tenderizer from slipping out of the user's hand or meat during the process of meat tenderization.

Another still further object of the present invention is to provide a double function meat tenderizer by pounding or surface treating of the meat using evenly laid-out protruding teeth on the bottom of a movable comb.

Still another object is to provide a meat tenderizer which is easy and fast to disassemble the tenderizer for cleaning or replacement of the blades.

In order to accomplish the aforementioned object, according to one aspect of the present, there is provided a double function-hand operated meat tenderizer including a handle being formed of two components, a blade assembly being detachably mounted between the two components of the handle, a plurality of columns where upper ends of the columns are operationally mounted to the handle, and a comb being mounted on lower ends of the columns for being slidably movable toward and away from the handle. The comb has a plurality of flow-through slots, and a plurality of protruding teeth extending from a bottom surface of the comb.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment according to the present invention will be described with reference to the accompanying drawings. In the following description of the present invention, a detailed description of known functions and configurations incorporated herein will be omitted when it may obscure the subject matter of the present invention.

The present invention provides an esthetic effect through the original and individual shape of exterior surfaces and lines of intersection with the visual combination of the housing material with the stainless steel blades.

Figure 1:
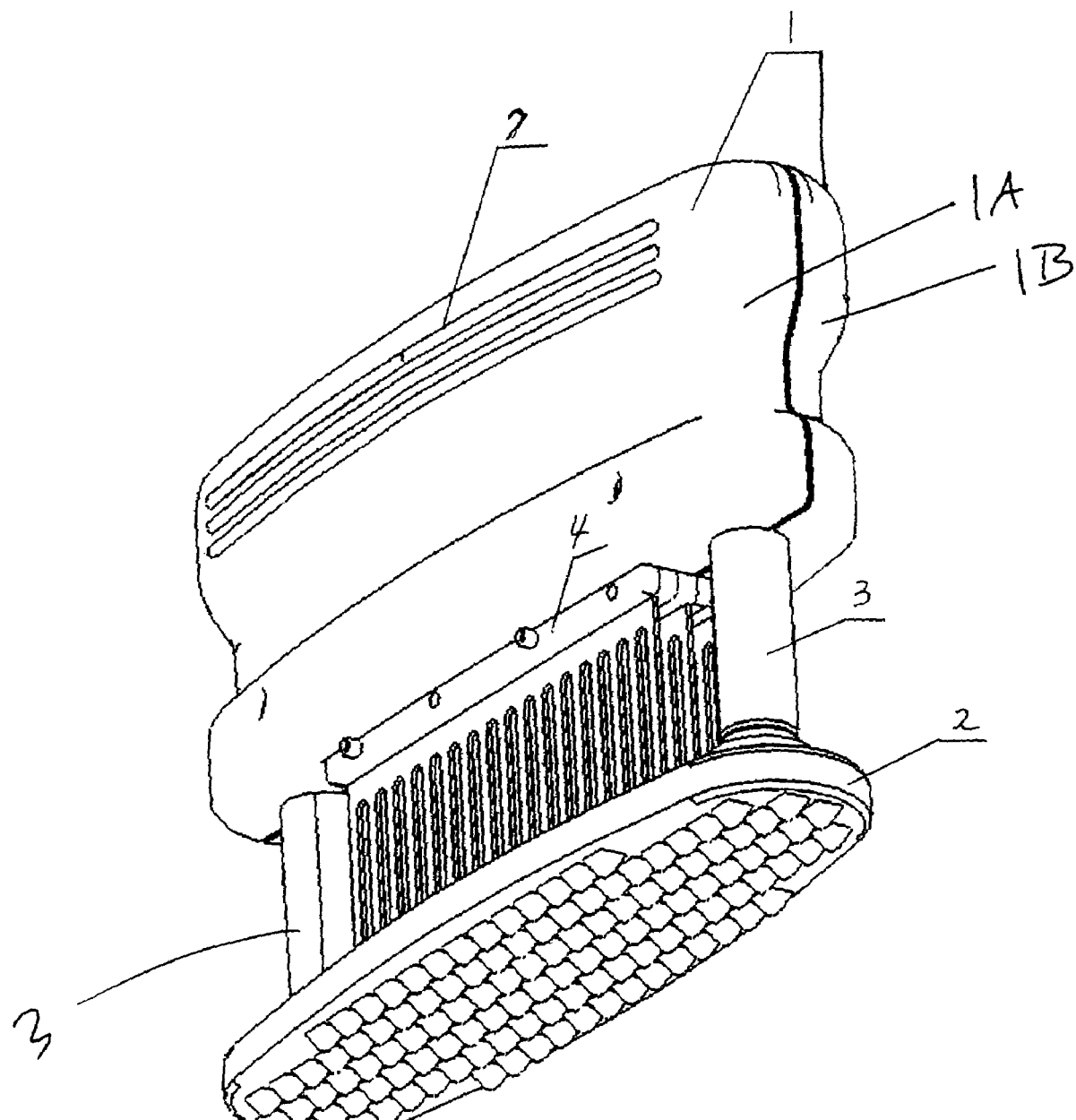
FIG. 1 is an assembled perspective view of a double function—hand operated meat tenderizer according to a preferred embodiment of the present invention in which the blades are hidden.
Figure 3:
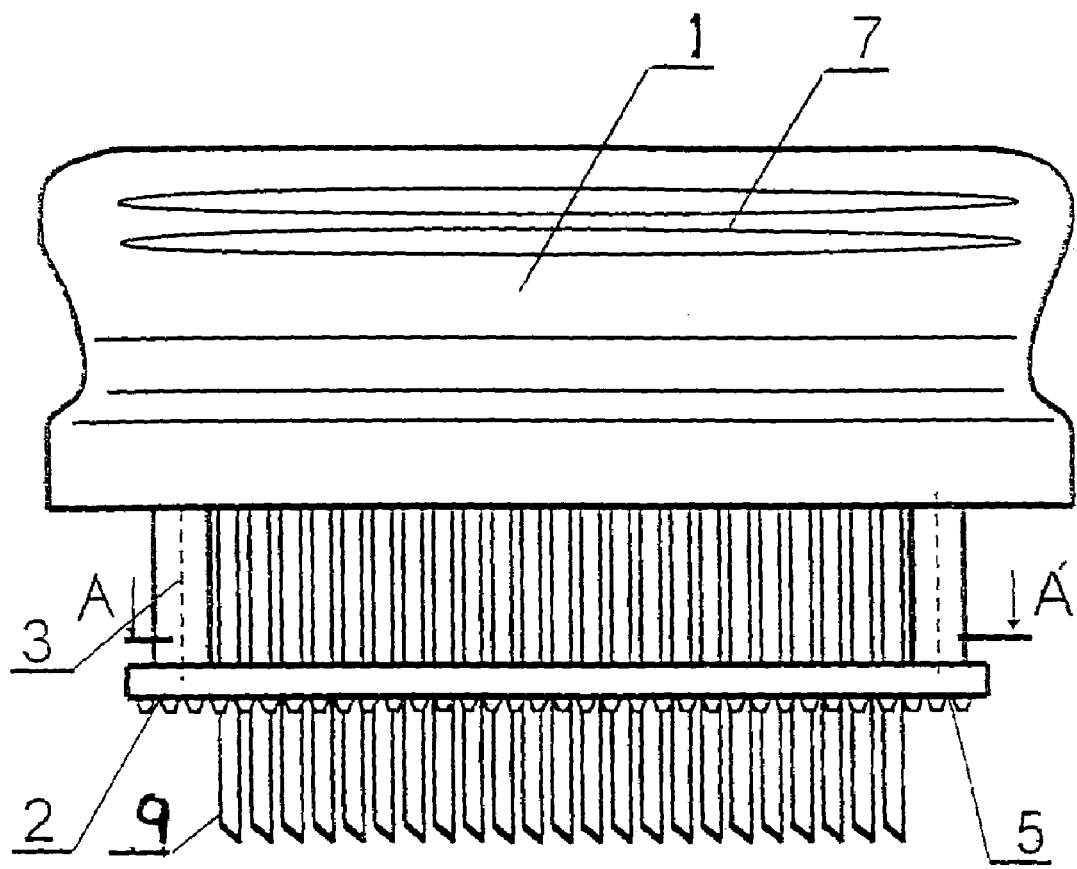
FIG. 3 is a front plan view of the meat tenderizer shown in FIG. 1 in which the blades are exposed.

As shown in FIGS. 1 and 3, a double function-hand operated meat tenderizer according to the preferred embodiment of the present invention includes a handle 1 being formed of two components 1A and 1B, a blade assembly 4 being detachably mounted between the two components 1A and 1B of the handle 1, at least two columns 3, being supplied and operatively connected to the handle 1, and a comb 2 being mounted on lower ends of the columns 3 for being slidably movable toward and away from the handle 1. The device handle 1 is ergonomically oval-rectangular-shaped with a horizontal cross-section similar to an ellipse. The columns 3 slide into the handle 1. The handle 1 has a plurality of horizontal notches 7 on the lateral surface of the handle 1. More particularly, in the top part of the handle 1, slightly protruding straps are provided on the sides of the handle 1 to prevent the device from slipping out the hand of the user. Also, on the bottom part of the handle 1, a movable comb 2 is fixed on the at least two columns 3 in which springs are fixed with a plastic pilot bar (not shown) which allows easy downward and return upward movements. This is needed for the blades of the blade assembly 4 to slice through the connective tissue. Because of this movement, the meat tenderizer of the present invention easily covers large areas over the top of the meat, tenderizing it and piercing it evenly in a very short period of time.

The blade assembly 4 includes a plurality of blade segments having a plurality of spaced, long, thin, knife blades 9 which is configured in multiple rows. The blade segment of the blade assembly 4 is also replaceable. The protruding blades 9 are fixed to the bottom part of the handle 1. Preferably, the blade assembly 4 has three rows of 17 blades, for a total of 51 protruding blades 9. Any number of rows or blades can be applied. The tips of the protruding blades 9, when the comb 2 is at a maximum distance from the handle 1, are effectively hidden in the flow-through slots 6 of the comb 2, which is joined via column 3 to the handle 1, and do not protrude beyond the surface 5 of the comb 2. A resilient member (not shown) is retained in the columns 3 and is associated with the handle 1. The resilient member is preferably a compressing spring.

When constructed pursuant to this design and its alternate versions, the tenderizer has an individual and original appearance because of the optimally designed geometric shapes of the surfaces of each component and the component of the device.

Figure 2:
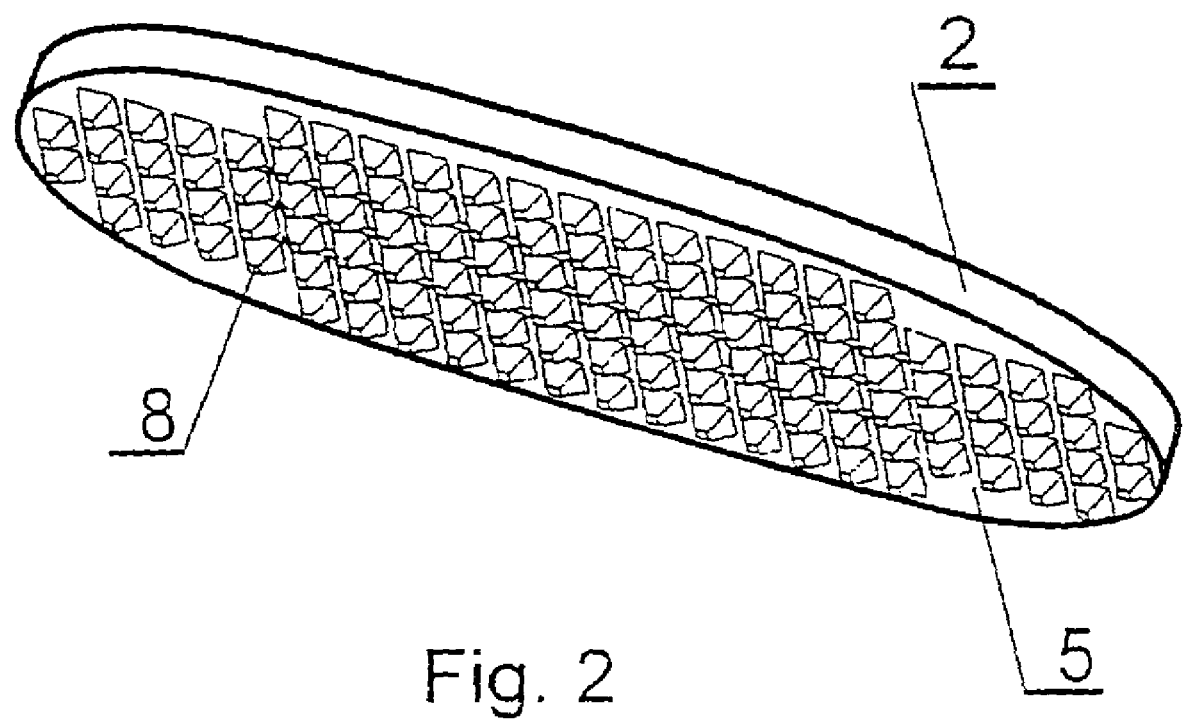
FIG. 2 is a perspective view illustrating a comb having a protruding teeth shown in FIG. 1.

As shown in FIG. 2, a bottom surface 5 of the oval comb 2 has a plurality of protruding teeth 8 which are effectively designed as truncated pyramids or cones, to tenderize the meat. Because of the proper adjustment of the springs (not shown), the natural juices remain in the meat and are not pushed out of the meat, as it happens in the case of the other meat tenderizing mallets of similar function.

Figure 4:
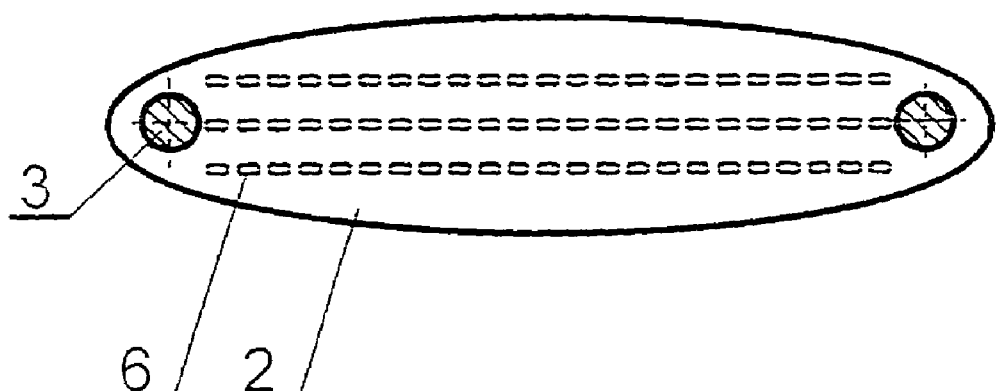
FIG. 4 is a horizontal cross-sectional view taken along the line A–A' of FIG. 1, illustrating comb surface and slots shown in FIG. 1.

As shown in FIG. 4, the comb 2 has plurality of flow-through slots 6 and protruding teeth 8 extending from a bottom surface 5 of the comb 2. The oval comb 2 has the flow-through slots 6, through which the protruding blades 9 pass.

The movable comb 2 is made with hollows for the blades of the blade assembly 4. This enables the protruding blades 9, fixed in the handle 1, to freely move upward and downward through the comb 2 thereby piercing the required portion of the meat. The tenderizer of the present invention tenderizes the meat in a uniform way.

In the normal position, the blades are hidden. Upon pressing the comb 2 on the top of meat, the comb 2 and the columns 3 are forced upward against a tension force supplied by the springs, with the columns 3 being forced into the handle 1. The blades slice in the connective tissue as the comb 2 pushes upward.

In order to clean or replace the blades, the user can disassemble the tenderizer but in certain cases cleaning or replacement of the blades of these tenderizers was too complicate and somewhat difficult. Accordingly, the tenderizer of the present invention is easy and fast to assemble and disassemble the device.

Figure 5:
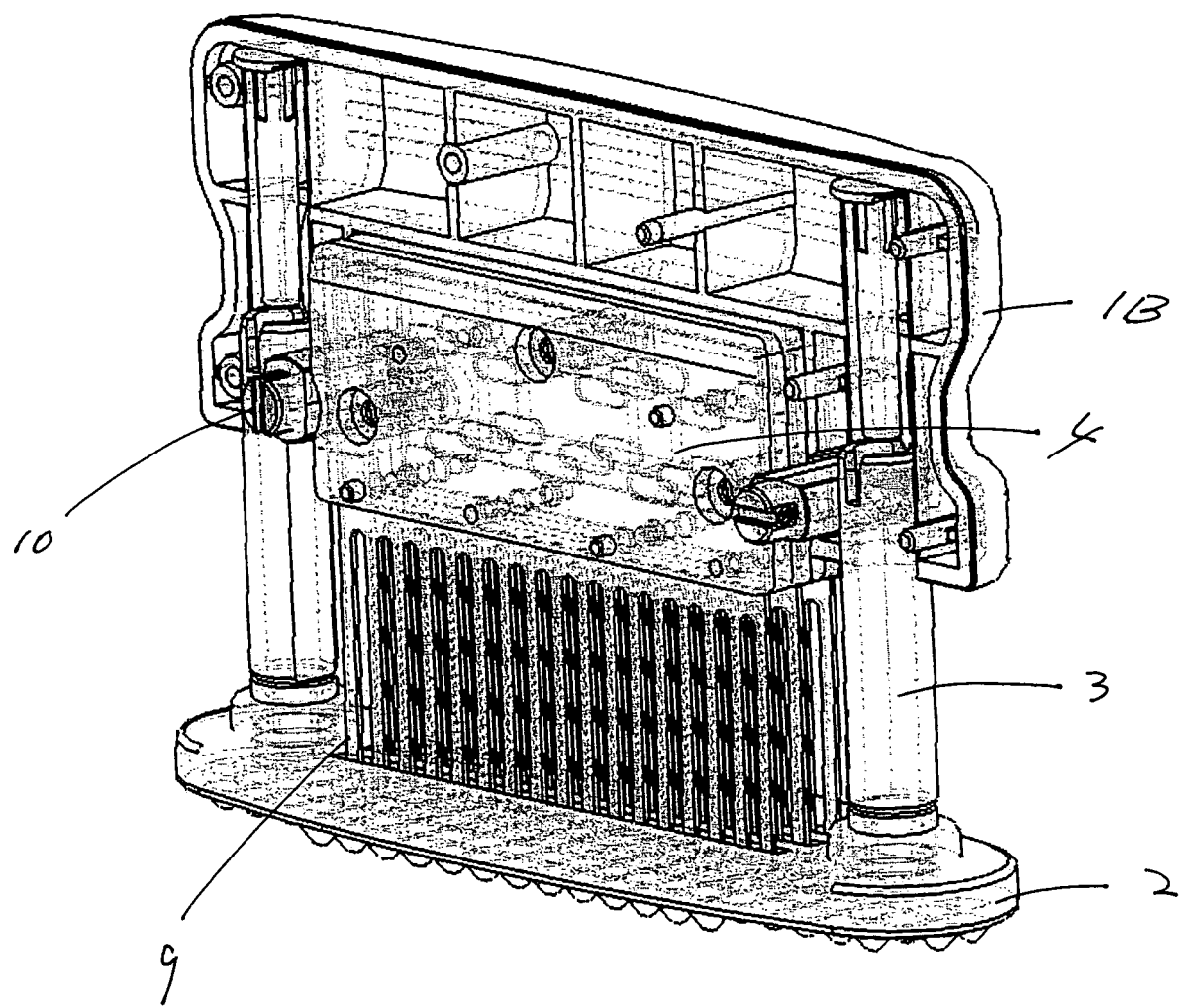
FIG. 5 is a disassembled perspective view of the meat tenderizer shown in FIG. 1.

As shown in FIG. 5, the handle 1 is assembled by interlocking locking pins 10 provided in one part of the die-casting and the assembly holes in the other. The movable foot consists of the comb 2 and the at least two columns 3 on one side with stoppers.

Each row of protruding blades 9 is cast in plastic on one end. The blades 9 then connect on the plastic coated end by interlocking the locking pins 10. Three rows of blades can be connected at one time in the preferred embodiment.

Since the locking pins 10 have at least one flat surface, assembly of the blades and movable foot is possible only when the stainless steel locking pins 10 are turned into a vertical position where the pins 10 may be turned every 90 degrees and blocked. The elements are inserted into the previously assembled handle 1 with vertically position pins and then turned 90 degrees with screwdriver for being ready to use.

In order to maintain the machine in an ideal sanitary condition, an easy dismantling function is provided. For the purpose of easy dismantling, the special locks, for example, stainless steel locking pins 10, are provided on both sides of the handle.

Upon turning of the locking pins 10 from the horizontal to vertical position, by 90 degrees, the blades 9 and the movable foot with columns 3 can be taken apart for thorough cleaning or replacement of new ones. The handle 1 is assembled by locking the pins 10.

The blades 9, columns 3, springs and the locking pins 10 are preferably made of high quality 301 stainless steel material. The handle 1 and other parts of the machine are preferably made of ABS, LUSTRAN ULTRA HX plastic.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A double function-hand operated meat tenderizer, comprising:
   a handle being formed of two components;
   a blade assembly being detachably mounted between the two components of the handle;
   at least two columns, upper ends of the columns being movably connected to the handle; and a comb being mounted on lower ends of the columns for being slidably movable toward and away from the handle, the comb having a plurality of flow-through slots and protruding teeth extending from a bottom surface of the comb.

2. The meat tenderizer of claim 1, further comprising a resilient member being retained in the columns and being associated with the handle for providing a compressive force to a face exerted on the bottom surface of the comb.

3. The meat tenderizer of claim 2, wherein the resilient member is a compression spring.

4. The meat tenderizer of claim 1, wherein the blade assembly comprises a plurality of blade segment having a plurality of spaced, long, thin, knife blades which is configured in multiple rows, said blades being extendable through said flow-through slots.

5. The meat tenderizer of claim 4, wherein the blade segment is replaceable.

6. The meat tenderizer of claim 1, wherein the handle comprises a plurality of horizontal notches on a lateral surface of the handle for preventing handle slip in a user's hand.

7. The meat tenderizer of claim 1, wherein the handle is oval-rectangular shaped.

8. The meat tenderizer of claim 1, wherein the comb is oval-shaped.

9. The meat tenderizer of claim 1, wherein the protruding teeth are equally laid out on the bottom surface of the comb and each tooth is in the form of pyramid or cone.

10. A double function-hand operated meat tenderizer, comprising:

a handle;

a plurality of blades extending from the bottom of the handle;

a comb operatively connected to the handle and adapted to resiliently move toward and away from said handle, said comb having a plurality of slots to permit said plurality of blades to pass therethrough when said comb is moved toward said handle; and a plurality of protruding teeth extending from the bottom surface of said comb.

* * * * *